US008842643B1

(12) United States Patent
Oroskar et al.

(10) Patent No.: US 8,842,643 B1
(45) Date of Patent: Sep. 23, 2014

(54) DYNAMIC ADJUSTMENT OF THE MAXIMUM PERIOD BETWEEN OVERHEAD-MESSAGE TRANSMISSIONS ON A PAGING CHANNEL

(75) Inventors: Siddharth S Oroskar, Overland Park, KS (US); Sachin R Vargantwar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 301 days.

(21) Appl. No.: 12/838,314

(22) Filed: Jul. 16, 2010

(51) Int. Cl.
*H04J 3/00* (2006.01)

(52) U.S. Cl.
USPC .......................................................... 370/336

(58) Field of Classification Search
CPC ..... H04W 68/00; H04W 72/005; H04W 4/14; H04W 24/00; H04W 72/04; H04W 48/12; H04B 1/707
USPC ......... 370/252, 311, 328, 329, 331, 335, 336, 370/346, 412, 431, 458; 455/426, 434, 445
See application file for complete search history.

(56) References Cited

U.S. PATENT DOCUMENTS

| | | | |
|---|---|---|---|
| 5,369,681 A | 11/1994 | Boudreau et al. | |
| 6,181,945 B1 | 1/2001 | Lee | |
| 6,233,247 B1 | 5/2001 | Alami et al. | |
| 6,374,103 B1 * | 4/2002 | Kamel et al. | 455/434 |
| 6,480,504 B1 * | 11/2002 | Wang et al. | 370/442 |
| 6,526,027 B1 * | 2/2003 | Yeom | 370/312 |
| 6,745,039 B1 | 6/2004 | Di Lalla | |
| 6,990,341 B2 * | 1/2006 | Kang et al. | 455/434 |
| 7,366,526 B2 | 4/2008 | Zhang et al. | |
| 2003/0054820 A1 * | 3/2003 | Kang et al. | 455/434 |
| 2005/0085253 A1 | 4/2005 | Mansour | |
| 2006/0040681 A1 | 2/2006 | Julka et al. | |
| 2006/0251033 A1 | 11/2006 | Oprescu-Surcobe et al. | |
| 2006/0268768 A1 * | 11/2006 | Harris et al. | 370/328 |
| 2008/0032713 A1 | 2/2008 | Yang | |
| 2008/0096520 A1 | 4/2008 | Benco et al. | |
| 2008/0293437 A1 | 11/2008 | Ranganathan et al. | |

OTHER PUBLICATIONS

Unpublished U.S. Appl. No. 12/690,629, filed Jan. 20, 2010 entitled "Dynamic Paging Concatenation".
Unpublished U.S. Appl. No. 12/558,359, filed Sep. 11, 2009 entitled "Dynamic Paging Concatenation".

(Continued)

*Primary Examiner* — Jae Y Lee
*Assistant Examiner* — Jean F Voltaire

(57) ABSTRACT

Exemplary methods and systems are disclosed herein that may help to prevent pages to the same mobile station from being repeatedly shed in order to send overhead messages. An exemplary method may involve a base station: (a) detecting a page-shedding event; (b) in response to detecting the page-shedding event, adjusting a maximum period between overhead-message transmissions; and (c) transmitting at least one overhead message according to the adjusted maximum period between overhead-message transmissions. A page-shedding event typically involves an overhead message being sent in a given paging-channel slot instead of a page that was previously scheduled for the given paging-channel slot. Preferably, in order that a page is not repeatedly shed in the same slot during the slot cycle, the maximum period between overhead-message transmissions may be adjusted such that the slot cycle duration is not a multiple of the maximum period.

16 Claims, 3 Drawing Sheets

(56) References Cited

OTHER PUBLICATIONS

Unpublished U.S. Appl. No. 12/553,661, filed Sep. 3, 2009 entitled "Method and System for Paging a Mobile Station".
Unpublished U.S. Appl. No. 12/572,829, filed Oct. 2, 2009 entitled "Overflow Pages in Heavily Loaded Slots".
Unpublished U.S. Appl. No. 12/564,213, filed Sep. 22, 2009 entitled "Method for Increasing the Number of Concurrent Page Records Sent to Mobile Stations".
Unpublished U.S. Appl. No. 12/776,287, filed May 7, 2010 entitled "Dynamic Paging for Hybrid Mobile Stations".
Unpublished U.S. Appl. No. 12/786,184, filed May 24, 2010 entitled "Dynamic Adjustment of Paging Power Based on Page-Type".
Unpublished U.S. Appl. No. 12/786,174, filed May 24, 2010 entitled "Dynamic Paging Concatenation Based on Page-Type".
Cai et al., "Mitigating DoS Attacks on the Paging Channel by Efficient Encoding in Page Messages," http://www.cs.ucdavis.edu/~hchen/paper/), 2009.

\* cited by examiner

DYNAMIC ADJUSTMENT OF THE MAXIMUM PERIOD BETWEEN OVERHEAD-MESSAGE TRANSMISSIONS ON A PAGING CHANNEL

BACKGROUND

To provide cellular wireless communication service, a wireless service provider or "wireless carrier" typically operates a radio access network (RAN) that defines one or more coverage areas in which mobile stations can be served by the RAN and can thereby obtain connectivity to broader networks such as the public switched telephone network (PSTN) and the Internet. A typical RAN may include one or more base transceiver stations (BTSs) (e.g., macro network cell towers and/or femtocells), each of which may radiate to define a cell and cell sectors in which mobile stations can operate. Further, the RAN may include one or more base station controllers (BSCs) (which may also be referred to as radio network controllers (RNCs)) or the like, which may be integrated with or otherwise in communication with the BTSs, and which may include or be in communication with a switch or gateway that provides connectivity with one or more transport networks. Conveniently with this arrangement, a cell phone, personal digital assistant, wirelessly equipped computer, or other mobile station that is positioned within coverage of the RAN can then communicate with a BTS and in turn, via the BTS, with other served devices or with other entities on the transport network.

Wireless communications between a mobile station and a serving BTS in a given coverage area will typically be carried out in accordance with one or more agreed air interface protocols that define a mechanism for wireless exchange of information between the mobile station and BTS. Examples of such protocols include CDMA (e.g., EIA/TIA/IS-2000 Rel. 0, A (commonly referred to as "IS-2000" or "1xRTT"), EIA/TIA/IS-856 Rel. 0, A, or other version thereof (commonly referred to as "IS-856", "1xEV-DO", or "EVDO")), iDEN, WiMAX (e.g., IEEE 802.16), LTE, TDMA, AMPS, GSM, GPRS, UMTS, or EDGE, and others now known or later developed.

The air interface protocol will generally define a "forward link" encompassing communications from the BTS to mobile stations and a "reverse link" encompassing communications from mobile stations to the BTS. Further, each of these links may be structured to define particular channels, through use of time division multiplexing, code division multiplexing (e.g., spread-spectrum modulation), frequency division multiplexing, and/or some other mechanism.

The forward link, for example, may define (i) a pilot channel on which the RAN may broadcast a pilot signal to allow mobile stations to detect wireless coverage, (ii) system parameter channels (e.g., a sync channel) on which the RAN may broadcast system operational parameters for reference by mobile stations so that the mobile stations can then seek network access, (iii) paging channels on which the RAN may broadcast page messages to alert mobile stations of incoming communications, and (iv) traffic channels on which the RAN may transmit bearer traffic (e.g., application data) for receipt by mobile stations. And the reverse link, for example, may define (i) access channels on which mobile stations may transmit "access probes" such as registration messages and call origination requests, and (ii) traffic channels on which mobile stations may transmit bearer traffic for receipt by the RAN.

In a conventional CDMA wireless network compliant with the well known IS-2000 standard, each cell employs one or more carrier frequencies, typically 1.25 MHz in bandwidth each, and each sector is distinguished from adjacent sectors by a pseudo-random number offset ("PN offset"). Further, each sector can concurrently communicate on multiple different channels, distinguished by "Walsh codes." In doing so, each channel is allocated a fraction of the total power available in the sector. When a mobile station operates in a given sector, communications between the mobile station and the BTS of the sector are carried on a given frequency and are encoded by the sector's PN offset and a given Walsh code.

When a RAN receives an incoming communication for a mobile station, the RAN typically pages the mobile station via a paging channel in at least the coverage area in which the mobile station last registered. When a mobile station receives a page, it will conventionally respond to the BTS of its serving system with a page response message. However, in some cases, the serving system will not receive the page response, which would mean that a failure of some sort occurred in paging the mobile station. When that happens, the serving system (i.e., the switch and base station serving the mobile station) may try re-paging the mobile station. Typically, a RAN is configured so that up to a predetermined number of attempts to send a page can be made, before the page is deemed to have failed.

OVERVIEW

Under the IS-2000 protocol, a time division multiple access (TDMA) scheme is used for the paging channel, which is accordingly divided into paging-channel slots (which may also be referred to as "timeslots"). In particular, the paging slot cycle may include a predetermined number of 80 millisecond (ms) slots. In IS-2000 systems, the paging slot cycle may be set in multiples of 1.28 seconds (or 16 slots), and is commonly set to 5.12 seconds (or 64 slots), according to a system parameter referred to as the slot cycle index (SCI). Each mobile station will typically be assigned a particular slot in the slot cycle during which the mobile station will wake up and check the paging channel for a page. A serving system may then schedule pages to a given mobile station during its assigned slot in the slot cycle.

An IS-2000 system may also send overhead messages via the paging channel. Generally, overhead messages are sent in open paging-channel slots (i.e., slots in which no pages are scheduled). However, during peak traffic conditions, the paging channel occupancy can reach a level where the paging channel is overloaded, in which case pages may be "shed" (i.e., not transmitted when scheduled) so that required overhead messages can be sent instead. Specifically, IS-2000 specifies that certain overhead messages must be sent once every 1.28 seconds. Therefore, if 1.28 seconds has elapsed since a given overhead message has been transmitted, pages scheduled for the next slot will be shed in order that the overhead message can be sent instead. If more attempts to send the page can be made, existing serving systems typically reschedule the page for the mobile station's assigned slot during the next slot cycle. On the other hand, if the maximum number of attempts has been reached, the page may be deemed to have failed, and efforts to send the page may accordingly cease.

The fact that the slot cycle duration is a multiple of 1.28 seconds may present a problem when the network is heavily loaded, as the network may repeatedly shed pages to the same mobile station, potentially causing the page to fail. Specifically, when the paging channel is heavily loaded, the network may be forced to shed a page every 1.28 seconds in order to send an overhead message. And since the slot cycle duration (e.g., 5.12 seconds) is a multiple of 1.28 seconds, a page may be shed in the same slot during each slot cycle. As a result, a page to a mobile station that is assigned to that slot may be repeatedly shed. As existing systems typically only make a predetermined number of attempts to reschedule a given page, it is possible that the page will eventually be considered to have failed, and the page will never reach the intended mobile station. Accordingly, an exemplary method may help to adjust the maximum period between overhead-message transmissions, such that pages to the same mobile station (or the same mobile stations) are not repeatedly shed.

In one aspect, an exemplary method may involve: (a) a base station detecting a page-shedding event; (b) in response to detecting the page-shedding event, the base station adjusting a maximum period between overhead-message transmissions; and (c) the base station transmitting at least one overhead message according to the adjusted maximum period between overhead-message transmissions. In an exemplary embodiment, a page-shedding event typically involves an overhead message being sent in a given paging-channel slot instead of a page that was previously scheduled for the given paging-channel slot.

Preferably, the maximum period between overhead-message transmissions is adjusted such that the slot cycle duration is not a multiple of the maximum period. For example, if slot cycle is 5.12 seconds, adjusting the maximum period between overhead-message transmissions may involve setting the maximum period between overhead-message transmissions equal to a period of which 5.12 seconds is not a multiple, such as 1.36 seconds or 1.20 seconds for example.

In another aspect, an exemplary system may include: (i) a tangible computer readable medium; and (ii) program instructions stored on the tangible computer readable medium and executable by at least one processor to: (a) detect a page-shedding event at a base station; (b) in response the page-shedding event, adjust a maximum period between overhead-message transmissions; and (c) cause the base station to transmit at least one overhead message according to the adjusted maximum period between overhead-message transmissions.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

Exemplary embodiments of the present invention are described herein with reference to the drawings, in which.

DETAILED DESCRIPTION

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

The present invention will be described by way of example with reference to Code Division Multiple Access ("CDMA") communications in general, and to IS-2000 communications in particular. As described below, IS-2000 applies to both circuit-cellular and packet-data communications. Under IS-2000, packet-data communications are referred to as "1X-RTT" communications, also abbreviated as just "1X." However, since IS-2000 supports both circuit voice and packet data communications, the term 1X (or 1X-RTT) is sometimes used to more generally refer to the IS-2000 air interface, without regard to the particular type of communication carried. It should be understood that the present invention may apply to other wireless voice and data protocols including, without limitation, IS-95, GSM, IS-856 (EVDO), which, together with IS-2000 are considered herein, individually or in any combination, to comprise a CDMA family of protocols.

I. Exemplary Network Architecture

Figure 1:
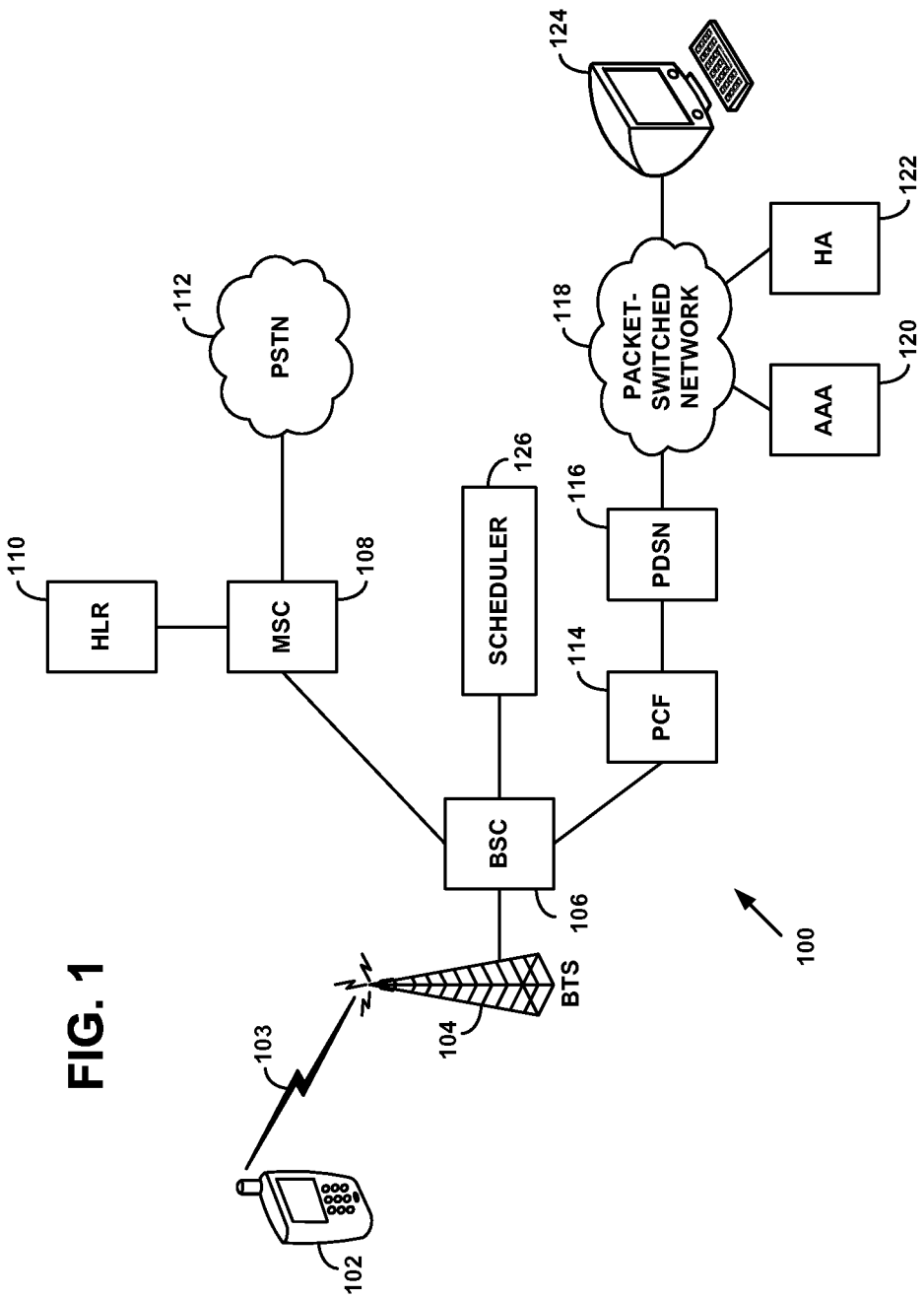
FIG. 1 is a simplified block diagram of a wireless communication system in which an exemplary embodiment may be employed.

FIG. 1 shows a simplified block diagram of a wireless communication system 100 in which an exemplary embodiment may be employed. The communication system 100 is configured to provide wireless service to a mobile station 102, and includes a base transceiver station (BTS) 104, a base station controller (BSC) 106, and a mobile switching center (MSC) 108. BTS 104, BSC 106, MSC 108 may be referred to as part of a larger radio access network (RAN) implemented by a service provider. As shown, mobile station 102 communicates over an air interface 103 with a BTS 104, which is then coupled or integrated with a BSC 106. Transmissions over air interface 103 from BTS 104 to mobile station 102 represent the forward link to the mobile station, while transmissions over interface 103 from mobile station 102 to BTS 104 represent the reverse link.

BSC 106 is in turn connected to MSC 108, which acts to control assignment of air traffic channels (e.g., over air interface 103), and provides access to wireless circuit-switched services such as circuit-voice and circuit-data (e.g., modem-based packet data) service. As represented by its connection to a public switched telephone network (PSTN) 112, MSC 108 is also coupled with one or more other MSCs or other telephony circuit switches in the operator's (or in a different operator's) network, thereby supporting user mobility across MSC regions, and local and long-distance landline telephone services. Also connected to MSC 108 is home location register (HLR) 110, which supports mobility-related aspects of subscriber services, including dynamic tracking of subscriber registration location and verification of service privileges.

As shown, BSC 106 is also connected to a packet data serving node (PDSN) 116 by way of packet control function (PCF) 114. PDSN 116 in turn provides connectivity with a packet-switched network 118, such as the Internet and/or a wireless carrier's private core packet-network. Sitting as nodes on network 118 are, by way of example, an authentication, authorization, and accounting (AAA) server 120, a mobile-IP home agent (HA) 122, and a remote computer 124.

With the arrangement described above, a mobile station 102 can engage in cellular voice and/or packet-data (e.g., 1X-RTT or EVDO) communications. Taking an originating call from mobile station 102 as an example, mobile station 102 first sends an origination request over air interface 103 and via the BTS 104 and BSC 106 to MSC 108. The MSC then signals back to the BSC directing the BSC to assign an air interface traffic channel for use by the mobile station. For a voice call, the MSC uses well-known circuit protocols to signal call setup and establish a circuit connection to a destination switch that can then connect the call to a called device (e.g., landline phone or another mobile station). For a packet-data session, the BSC signals to the PDSN 216 by way of PCF 214. The PDSN 216 and mobile station 102 then negotiate to establish a data link layer connection, such as a point to point protocol (PPP) session. Further, the PDSN 216 sends a foreign agent advertisement that includes a challenge value to the mobile station, and the mobile station 102 responds with a mobile-IP registration request (MIP RRQ), including a response to the challenge, which the PDSN forwards to HA 222. The HA then assigns an IP address for the mobile station 102 to use, and the PDSN passes that IP address via the BSC to the mobile station.

Generally, it should be understood that the depiction of just one of each network element in FIG. 1 is illustrative, and there could be more than one of any of them, as well as other types of elements not shown. The particular arrangement shown in FIG. 1 should not be viewed as limiting with respect to the present invention. Further, the network components that make up a wireless communication system such as system 100 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as exemplary mobile station 102 typically comprises a user-interface, I/O components, a communication interface, a tone detector, a processing unit, and data storage, all of which may be coupled together by a system bus or other mechanism.

Throughout this description, the term "base station" may be used to refer to a BTS, a BSC, or a combination of one or more BTSs and a BSC, for instance. The term "radio network controller" (RNC) can also be used to refer to a BSC, or more generally to a base station. Further, it should be understood that actions that are generally described as being carried out by the RAN (or simply by the "network") may be carried out by various different entities or combinations of entities in the RAN. Moreover, actions described as being carried out by one network entity may also be carried out by other network entities, without departing from the scope of the invention.

II. General Paging Functionality

In each coverage area, the serving base station preferably broadcasts a specification of paging channels defined in the coverage area, so that a mobile station beginning to operate in the coverage area can determine how many paging channels the coverage area includes and, if more than one, can determine which paging channel to monitor. By way of example, this specification may be an indication in an overhead message referred to as a system parameters message, which the base station broadcasts periodically or repeatedly. Further, the specification may define the paging channels expressly by particular coding parameters or, as noted above may simply indicate how many paging channels there are, which may inherently define the paging channels if a sequence of possible paging channels exists.

A mobile station that has no active data session or voice call (i.e., no assigned traffic channel), but is otherwise operational, is said to be in an "idle" state or mode. While in the idle state, the mobile station periodically scans the air interface for communication from the wireless communication system. More specifically, the mobile station monitors the paging channel for page messages from its serving base station and/or other base stations. Page messages are used to send the mobile station information, alerts, and requests during times when the mobile station isn't engaged in a communication (i.e., when the mobile station is idle). For instance, the mobile station may be alerted of an incoming call or other incoming communications via a page message.

Accordingly, a RAN may be configured to page a mobile station by transmitting a page message via a paging channel. Paging is typically initiated when an MSC receives an indication that a mobile station should be paged (e.g., an incoming call), or when the MSC itself determines that a mobile station should be paged. The indication normally includes an identifier of the mobile station, such as a Network Access Identifier (NAI), a Mobile Directory Number (MDN), a Mobile Identification Number (MIN), an International Mobile Subscriber Identifier (IMSI), an electronic serial number (ESN), and a mobile equipment identifier (MEID). The MSC may then transmit some representation of the indication to the appropriate BTS or BTSs. In turn, the BTS may use the mobile-station identifier to generate a page record, which the BTS may then place in a GPM for transmission to the mobile station.

Each page record may contain error detection bits, such as a checksum. Thus, once the mobile station receives such a GPM, the mobile station typically will validate the checksum. If the checksum indicates that there are no bit errors in the page record, the mobile station may reply with a page-response message (PRM) on the access channel. After receiving the PRM, the RAN may then assign the one or more traffic channels to the mobile station. However, if the checksum indicates that one or more bits in the page record are in error, the mobile station may discard the GPM.

Normally, a GPM occupies two half-frames of a paging channel slot, and therefore each paging channel slot would support at most four page records. However, multiple page records within a GPM may be concatenated so that more mobile stations may be paged per GPM. For example, two page records can be concatenated so that they can be transmitted in a single GPM that occupies between two and three half-frames. Further, concatenation schemes may be defined so that even more page records, such as four or eight page records for instance, may be concatenated in a single 80 ms paging-channel slot can be concatenated per timeslot. Other concatenation schemes involving varying degrees of concatenation are also possible.

While concatenating multiple page records in a GPM can reduce load on the paging channel, this concatenation can have a deleterious impact on PSR. In order for page records to be concatenated, some information, such as error detection bits, may not be included in each page record in a GPM. As a result, when a given mobile station receives a GPM with one or more bit errors, the given mobile station may discard the entire GPM, even if the section of the GPM containing a page record for the given mobile station does not contain any bit errors. Thus, concatenation may result in some page records failing to reach their intended mobile stations, thereby reducing the PSR. In practice, a two to three percent decrease in the PSR may result from concatenation.

In practice, a RAN implements multiple paging channels (typically, up to seven), each subdivided into 2,048 periodically recurring, 80-millisecond (ms) slots in which pages can be transmitted. More specifically, under IS-2000 a recurring "slot cycle" (also referred to as a "paging slot cycle") including a predetermined number of timeslots is defined with within the 2,048-slot "maximum slot cycle" period (e.g., 163.84 seconds). The slot cycle is set according to a system parameter called the slot cycle index (SCI). For instance, slot cycle index values of 0, 1, and 2 define slot cycles of 1.28, 2.56, and 5.12 seconds, respectively (i.e., 16, 32, and 64 slots, respectively) per maximum slot cycle. In existing IS-2000 networks, an SCI of 2 is typically used, and therefore each paging slot cycle is 5.12 seconds, or 64 slots, in duration. However, it is contemplated that exemplary embodiments may be implemented in conjunction with any maximum slot cycle period, any SCI, and possibly entirely different paging schemes as well.

In an exemplary embodiment, each base station (e.g., BTS 104 and/or BSC 106) may include a scheduler 126, which functions to schedule page records received from switches, such as MSC 108, as they are received. It should be understood that while scheduler 126 is depicted as a separate entity from BTS 104 and BSC 106, a scheduler may also be integrated as hardware, software, and or firmware in a BSC or BTS. Furthermore, it is also possible that a scheduler may be implemented in another configuration altogether (as a system-wide scheduler, for instance).

In this context, each mobile station 102 is typically assigned a certain slot within the paging slot cycle. For instance, when a mobile station 102 connects to a given base station under IS-2000, the mobile station is typically assigned to a certain slot in the slot cycle based on the mobile station's International Mobile Station Identifier (IMSI). Further, the RAN may implement a "hashing function" that effectively randomizes the selection of slots such that, on average, no one slot in the slot cycle is assigned to substantially more mobile stations than any other slot. Other techniques for assigning slots to mobile stations may be used as well.

Accordingly, to help conserve battery power, a mobile station 102 typically monitors only its assigned slot on a given paging channel. Therefore, during each of its assigned slots, mobile station 102 will scan the paging channel for any possible messages (i.e., pages). For example, when the slot cycle is 5.12 seconds, mobile station 102 will scan the paging channel every 5.12 seconds for any pages directed to the mobile station. In practice, the duration of the scan is typically 80-120 ms, although longer or shorter scans are possible depending on the structure of the paging channel, whether a message has been sent, the length of the message, and the RF conditions on the mobile station's forward link, among other factors.

III. Resending Pages and Zone-Based Paging

In a further aspect of paging, a RAN will typically resend a page (and possibly do so a number of times) when a page fails to reach (or seemingly fails to reach) a mobile station. More specifically, when a mobile station receives a page, it typically responds to the RAN with a page response message. Therefore, if the RAN does not receive the page response, the RAN deduces that a failure of some sort occurred in paging the mobile station. The failure could result from the mobile station being temporarily out of coverage or for some other reason. When this occurs, the switch in the serving system (e.g., MSC 108) preferably attempts to re-page the mobile station. In particular, an MSC 108 may wait a predetermined period of time (five seconds, for instance) to receive an indication from a base station, which indicates a page response message has been received. If the MSC 108 does not receive such an indication, the MSC will resend the page to the base station to be transmitted to the mobile station. The MSC will repeat this process until a page response message indicates that the page was successfully received, or the maximum number of attempts has been made without receiving a page response message, and the page is deemed to have failed.

Furthermore, when a RAN seeks to page a mobile station 102 (e.g., for an incoming call or for some other reason), a switch, such as MSC 108, may send a page to multiple base stations, such as BTS 104, with the hope that when the base stations broadcast the page message in multiple sectors, the mobile station 102 will receive the page message in at least one of the sectors, and will respond. Given the scarcity of paging channel resources in most modern cellular networks, paging across multiple sectors is typically implemented with a more-targeted paging process that is commonly referred to as "zone-based paging."

With zone-based paging, a cellular network is divided into paging zones, each with a respective zone ID, and paging is performed on a zone-basis. To facilitate this, each base station (e.g., BTS 104) in the system may broadcast as one of its overhead parameters the zone ID for the zone in which the base station is located. A mobile station 102 operating in the network may then programmatically monitor the zone IDs indicated in the overhead messages and may automatically register with the network when they detect that they have moved into a new zone, or for other reasons.

With this process, the registration records thereby maintained by switches and/or home location registers will indicate the paging zone in which each mobile station last registered. When a switch (e.g., MSC 108) seeks to page a mobile station, the switch may then efficiently send the page message to just those base stations that are within the zone of the mobile station's last registration, as it is likely that the mobile station is in that zone. Further, the switch may send the page message to the base stations in zones adjacent to the mobile station's zone of last registration, to cover the possibility that the mobile station has moved to a new zone but has not yet registered its presence in the new zone.

Using the general paging strategy that is implemented in many RANs providing IS-2000 and/or EVDO service, the network makes up to three attempts to page a mobile station. In particular, the MSC 108 may initiate a first attempt by sending a page record to one or more base stations for transmission in the paging zone in which the mobile station is registered (i.e., the base stations in the paging zone in which the mobile station is registered transmit the page record). Then, if the first attempt is unsuccessful (i.e., the mobile station does not acknowledge the page record), the MSC initiates a second attempt by again sending the page record to the one or more base stations for transmission in the paging zone in which the mobile station is registered, and possibly one or more additional base stations for transmission in one or more adjacent zones as well. If the second attempt also fails, then the MSC initiates a third attempt to page the mobile station, which typically involves sending the page record to multiple base stations for a system-wide transmission of the page record (i.e., in all paging zones), although it is possible that a third attempt may be of a different scope as well.

Due to the timing with which a switch initiates subsequent attempts to send a page, attempts may or may not be made in consecutive slot cycles. In particular, when a base station receives a first attempt, the base station typically schedules the page for the recipient mobile station's assigned slot. If the first attempt is unsuccessful, the scheduling of the subsequent attempt depends upon when the switch resends the page to the base station, and thus upon the period of time a switch waits before initiating the subsequent attempt. For example, in some IS-2000 networks, MSCs may be configured to wait five seconds between attempts. As such, by the time this period ends, the MSC sends the subsequent attempt to the base station, and the base station schedules the next attempt, the mobile station's assigned slot in the next slot cycle (i.e., 5.12 seconds after the first attempt) may have passed, and as such, the next attempt may be scheduled for the mobile station's assigned slot, two slot cycles later (i.e., 10.24 seconds after the initial attempt). However, it should be understood that the wait period for the page response may be adjusted such that attempts occur in consecutive slot cycle, or are separated by more than one slot cycle.

Generally, it should be understood that paging schemes other than zone-based paging may be employed, without departing from the scope of the invention. For instance, a base station may be paged only in the sector in which it is registered, or only in the zone in which it is registered. As such, it is also possible that a base station may the track the paging-attempt status, since such embodiments may not involve coordination between multiple base stations that send a given page under a zone-based paging scheme. As an example of another alternative embodiment, it is even possible that an exemplary embodiment may be implemented in a system in which no re-paging is performed—in this case, each page may simply be treated as the last attempt to send a given page.

IV. Overhead Messaging via the Paging Channel

In a further aspect, to provide mobile stations with information for operation in the RAN (e.g., configuration parameters or system-related information), the RAN may broadcast various overhead messages. At least some types of overhead messages may be sent via the paging channel. For example, in an IS-2000 system, a base station may send Access Parameters Messages, CDMA Channel List Messages, System Parameters Messages, Extended System Parameters Messages, Neighbor List Messages, Extended Neighbor List Messages, General Neighbor List Messages, Global Service Redirection Messages, Extended Global Service Redirection Messages, User Zone Identification Messages, and/or Private Neighbor List Messages via the paging channel. It is further contemplated that other types of overhead messages may also be sent via the paging channel. Furthermore, since the paging channel is used for both page messages and overhead messages, scheduler 126 may be configured to assign page and overhead messages to specific paging-channel slots.

As noted, once a mobile station has been assigned a timeslot in the paging slot cycle, pages to that mobile are generally scheduled during that timeslot. Overhead messages, on the other hand, are generally scheduled whenever open timeslots are available (e.g., in timeslots for which no pages are scheduled). For example, when the base station needs to send an overhead message, it may simply search for the first open timeslot, and schedule the overhead message for this timeslot. Other techniques for scheduling overhead messages may also be used.

Under IS-2000, there is a maximum period $T_{1b}$ between subsequent transmissions of an overhead message on the paging channel. In practice, $T_{1b}$ is typically set at 1.28 seconds. Therefore, while a given overhead message may generally be inserted whenever an open timeslot is available, IS-2000 requires that certain overhead messages must be sent at least once every 1.28 seconds. As such, if 1.28 seconds (i.e., 16 timeslots) have passed since the overhead message was last sent, then the overhead message must be sent in the next timeslot, regardless of whether a page is already scheduled for that timeslot. In this scenario, the RAN may be forced to "shed" (i.e., cancel) a page that is scheduled for the next timeslot, so that the overhead message can be sent instead.

In existing networks, since 1.28 seconds is a multiple of 5.12 seconds, pages to the same mobile station may be repeatedly dropped in times when the paging-channel occupancy (PCO) is high (i.e., when the network is highly congested). For example, when every timeslot is scheduled for use (i.e., when there are no open timeslots in a given slot cycle), and an overhead message cannot be scheduled, the base station will repeatedly reach $T_{1b}$, and each time will shed a previously-scheduled page or pages in order to send the overhead message. In particular, when there are no open timeslots for an extended period (i.e., for the duration of one slot cycle or longer), the base station will shed a page to send the overhead message every 1.28 seconds, and in so doing, will shed a page every 5.12 seconds (since 5.12 is a multiple of 1.28).

As a specific example, when a page to a given mobile is shed after 1.28 seconds, the a scheduler in an existing IS-2000 system will typically reschedule the page according to a zone-based paging scheme or the repetition of pages as specified by whatever paging scheme is being utilized. For instance, the page may be rescheduled for a mobile station's assigned slot during the next slot cycle, which is 5.12 seconds later when the SCI is 2. (Note that for simplicity in this example, and other examples herein, it is assumed that consecutive attempts to page a mobile station are scheduled in consecutive slot cycles. However, as explained above, it may also be the case that attempts to send a page are separated by one or more slot cycles.) When the paging channel remains fully loaded and all slots are in use, the scheduler will again shed a page 1.28 seconds later, then again 2.56 seconds later, then again 3.84 seconds, and then again 5.12 seconds later—the time at which the base station was scheduled to resend the page to the mobile station. Therefore, the previously-shed page is not retransmitted as scheduled, but is again shed and rescheduled. This may occur a number of times, until the page is deemed a failure and is not rescheduled. For instance, under a zone-based paging scheme, three attempts may be made to send a page, and thus a page that is shed in three consecutive slot cycles may be deemed a failed page and never reach the intended mobile station.

In an exemplary embodiment, scheduler 126 may by default employ a standard IS-2000 scheduling scheme, in which pages are generally scheduled in the designated slot for the mobile station to which the page is being sent, and in which $T_{1b}$ is set to 1.28 seconds. However, scheduler 126 preferably adjusts the scheduling scheme dynamically, and in times of high network traffic, adjusts $T_{1b}$ such that the slot cycle duration is not a multiple of $T_{1b}$.

V. Exemplary Methods and Systems

In order to help prevent a page to the same mobile station from being repeatedly shed, an exemplary system may be configured to detect when a page is shed, and responsively adjust the maximum period between overhead-message transmissions (e.g., $T_{1b}$) so that the pages are not shed during the same timeslot in consecutive slot cycles. An exemplary system may take the form of a tangible computer readable medium having program instructions stored thereon, which may be executed to provide the functionality described herein. An exemplary system may also take the form of an entity or entities in a RAN such as a switch (e.g., an MSC) and/or a base station (i.e., one or more BTS and/or a BSC), that include or have access to such program instructions and to provide the functionality described herein, or may take another form altogether.

Figure 2:
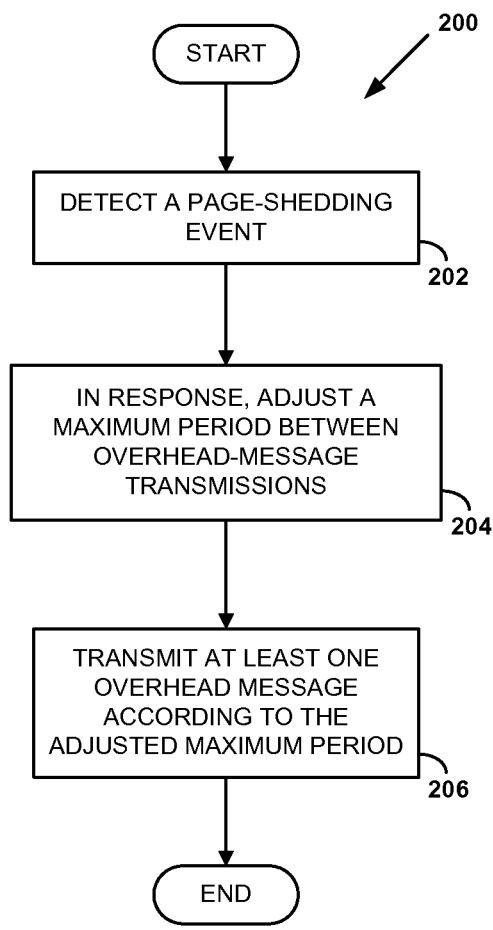
FIG. 2 is flow chart illustrating a method according to an exemplary embodiment.

FIG. 2 is flow chart illustrating a method 200 according to an exemplary embodiment. The method 200 is preferably carried out at a base station in RAN, and may be implemented to help prevent pages to the same mobile station from being repeatedly shed (and/or for other purposes). As shown by block 202, the method involves the base station detecting a page-shedding event. A "page-shedding event" is preferably any instance where a page, which was previously scheduled for a given paging-channel slot, is shed (i.e., not sent) in order to send an overhead message instead. In response to detecting the page-shedding event, the base station adjusts the maximum period between overhead-message transmissions, as shown by block 204. The base station then transmits at least one overhead message according to the adjusted maximum period between overhead-message transmissions, as shown by block 206.

As noted, the maximum period between overhead-message transmissions is preferably indicated by the $T_{1b}$ parameter, which may by default be set to 1.28 seconds. As noted, since the paging slot cycle is 5.12 seconds, which is a multiple of 1.28 seconds, this could potentially create a situation where a page to the same mobile station is repeatedly shed. Therefore, to adjust the maximum period between overhead-message transmissions, the base station preferably sets $T_{1b}$ equal to value of which the paging slot cycle is not a multiple. As examples, the base station may set $T_{1b}$ equal to 1.36 seconds or 1.20 seconds. Many other settings for $T_{1b}$ are also possible.

The maximum period between overhead-message transmissions may also be measured in terms of paging-channel slots (rather than a period of $T_{1b}$ seconds as described above). For example, under IS-2000, a maximum period of 1.28 seconds is equivalent to sixteen timeslots (of 80 ms each). Similarly, adjusting the maximum period by setting $T_{1b}$ equal to 1.36 seconds or 1.20 seconds, for example, is equivalent to setting the maximum period between overhead-message transmissions equal to 17 timeslots or 15 timeslots, respectively. More generally, when measuring the maximum period between overhead-message transmissions in terms of paging-channel slots, the base station may adjust the maximum period by setting it equal to a number of slots that is not a divisor of the number of slots in a paging slot cycle. For instance, under IS-2000, when the SCI is set equal to 2, the base station may generally adjust the maximum period by setting the maximum period equal to any number of timeslots that is not a divisor of 64.

In a further aspect, the maximum period between overhead-message transmissions may be set for all types of overhead messages or on a per-message-type basis. More specifically, IS-2000 specifies that a number of different types of overhead message (e.g., Access Parameters Messages, CDMA Channel List Messages, System Parameters Messages, etc.) must each be sent at least once every $T_{1b}$ seconds. Therefore, the maximum period $T_{1b}$ typically applies to multiple types of overhead messages, which may be sent at different times. Therefore adjusting $T_{1b}$ may affect all overhead-message types that must be sent at least once every $T_{1b}$ seconds. For instance, if a page is shed in order to send a System Parameters Message, and $T_{1b}$ is responsively set to 1.20 seconds, then other messages, such as an Access Parameters Message for instance, will be transmitted at least once every 1.20 seconds. In this scenario, the maximum period between transmissions of an Access Parameters Message is adjusted to be 1.20 seconds, along with all other overhead messages for which the maximum period $T_{1b}$ applies, even though the page-shedding event that triggered the adjustment, involved the shedding of a page to send another type of overhead message (i.e., the System Parameters Message).

In an alternative embodiment, the maximum period between overhead-message transmissions may be set independently for each type of overhead message. To do so, the base station may store a parameter associated with each type of overhead message, indicating the maximum period for that particular type. Accordingly, the method may further involve the base station, when a page-shedding event is detected, determining what type (or types) of overhead message was involved in the page-shedding event. As such, responsively adjusting the maximum period between overhead-message transmissions may involve adjusting only the maximum period for the type overhead messages involved in the page-shedding event (i.e., the type of overhead message that was sent instead of a previously scheduled page).

In another aspect, a page-shedding event may involve shedding a GPM that includes multiple page records (e.g., a multi-page-record GPM created according to FR4916E). As such, an exemplary method may help prevent failure of pages to multiple mobile stations. More specifically, by adjusting the maximum period between overhead-message transmissions so as to prevent a page-shedding event from recurring in the same slot in consecutive slot cycles, a multi-page-record GPM that is rescheduled due to a page-shedding event may be sent in the rescheduled slot, even if the paging channel remains fully loaded. In such an embodiment, the GPM itself (and thus all page records included therein) may be rescheduled. Alternatively, the page records in the GPM that was shed may be rescheduled individually, in which case the individual page records may be rescheduled for the same GPM or spread among multiple GPMs.

In yet another aspect, an exemplary method may involve a base station, after transmitting at least one overhead message according to the adjusted maximum period, as shown in block 206, readjusting a maximum period between overhead-message transmissions. For example, when the base station sheds a page in order to send a System Parameters Message, the base station may adjust the maximum period, for example, from 1.28 seconds to 1.36 seconds. Then, once another System Parameters Message is sent, the base station may reset the maximum period to its initial value of 1.28 seconds. Alternatively, after sending one or more System Parameters Messages, the base station may readjust the maximum period to another duration other than the original setting.

Furthermore, in some embodiments, the base station may only readjust the maximum period between overhead-message transmissions when it detects that the paging-channel occupancy has been reduced. For instance, after shedding a page in order to send a System Parameters Message, and responsively adjusting the maximum period, the base station may locate an open slot in which to send the next System Parameters Message. The base station is therefore able to send the next System Parameters Message in the open slot, before reaching the maximum period and being forced to shed a page. The base station may accordingly conclude that the paging-channel occupancy is lower (or more particularly, that the paging channel is no longer fully loaded), and responsively reset the maximum period between overhead-message transmissions.

Figure 3:
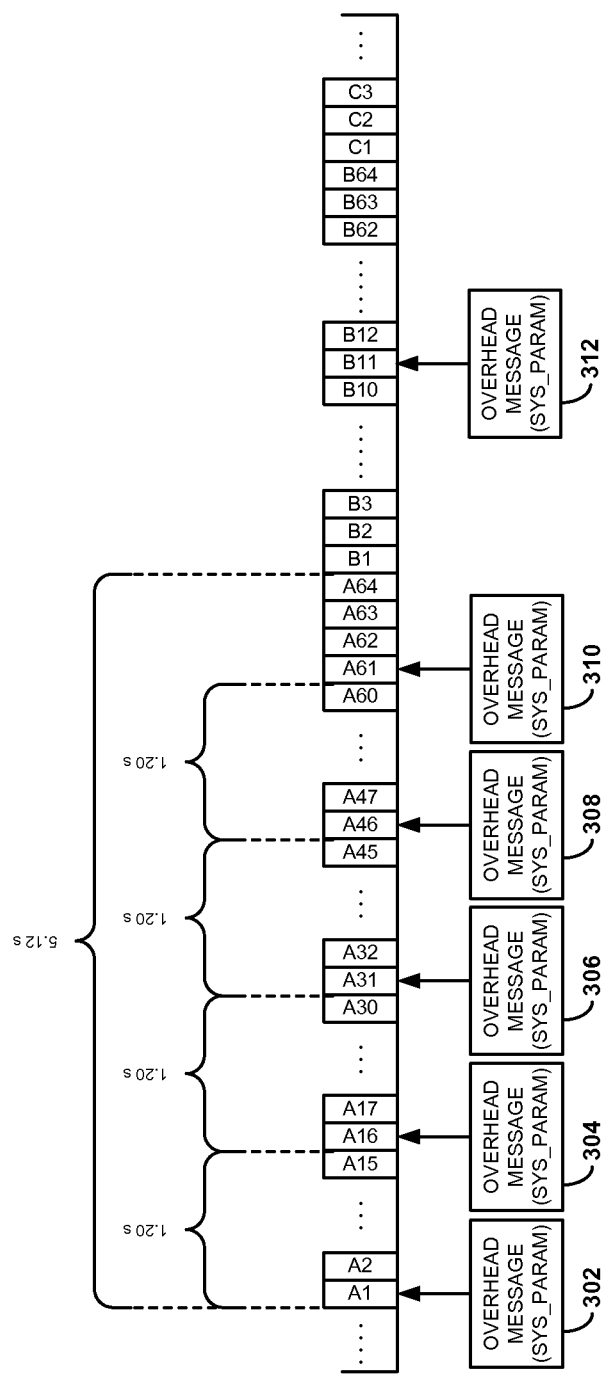
FIG. 3 is a timeline illustrating a scenario in which an exemplary method may help prevent a page to the same mobile station from being repeatedly shed.

FIG. 3 is a timeline illustrating a scenario in which an exemplary method may help prevent a page to the same mobile station from being repeatedly shed. The timeline shows a first paging slot cycle having 64 timeslots A1-A64, which is followed by subsequent paging slot cycle having 64 timeslots B1-B64, and so on. As each timeslot is 80 ms, each paging slot cycle is 5.12 seconds (i.e., SCI=2). A given mobile station may be assigned the first timeslot in each paging slot cycle, and therefore, when a page is received for the mobile station, the RAN may schedule the page for slot A1. However, if the paging channel is full, and a System Parameters Message, for example, was last sent in the $49^{th}$ timeslot of the previous cycle, the page to the mobile station will be shed, and the base station will instead send a System Parameters Message 302 in timeslot A1. Accordingly, the serving switch may detect that the attempt failed, and resend the page to the base station, which in turn will schedule the page for timeslot B1 (the mobile station's assigned timeslot during the next paging slot cycle).

According to an exemplary embodiment, responsive to the page being shed, the scheduler adjusts $T_{1b}$ to be a value that is not a multiple of the paging slot cycle period. For example, as 1.20 seconds is not a multiple of 5.12 seconds, the base station may set T1b equal to 1.20 seconds (i.e., 15 timeslots). Therefore, in the event that the paging channel remains full, a System Parameters Message will be sent every 15 timeslots. For instance, as shown on the timeline, pages are shed in order to send System Parameters Messages 302, 304, 306, 308, 310 and 312 in timeslots A1, A16, A31, A46, A61, and B11, respectively. Since a System Parameters Message is not required at timeslot B1, the base station thus avoids shedding the page that was rescheduled for timeslot B1 (a result that would have occurred if $T_{1b}$ had remained at 1.28 seconds).

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

We claim:

1. A method comprising:
initially transmitting, by a base station, one or more overhead messages according to a first duration of a maximum period between overhead-message transmissions, wherein each of the one or more overhead messages must be sent at least once during the duration of every maximum period;
the base station subsequently detecting a page-shedding event;
in response to detecting the page-shedding event, the base station adjusting the maximum period between overhead-message transmissions from the first duration to a second duration, wherein a adjusting the maximum period between overhead-message transmissions comprises setting the maximum period between overhead-message transmissions equal to a period of which a slot cycle duration of the base station is not a multiple;
the base station transmitting the one or more overhead messages according to the adjusted maximum period between overhead-message transmissions; and
after transmitting the at least one overhead message according to the adjusted maximum period between overhead-message transmissions, the base station readjusting a maximum period between overhead-message transmissions back to a default period.

2. The method of claim 1, wherein the page-shedding event comprises an overhead message being sent in a given paging-channel slot instead of a page that was previously scheduled for the given paging-channel slot.

3. The method of claim 1, wherein the maximum period between overhead-message transmissions is by default set equal to 1.28 seconds, and wherein adjusting the maximum period between overhead-message transmissions comprises setting the maximum period between overhead-message transmissions equal to a period of which 5.12 seconds is not a multiple.

4. The method of claim 1, wherein adjusting the maximum period between overhead-message transmissions comprises setting the maximum period between overhead-message transmissions equal to 1.36 seconds or 1.20 seconds.

5. The method of claim 1, wherein the maximum period between overhead-message transmissions comprises a maximum number of paging-channel timeslots between transmissions of a given type of overhead message.

6. The method of claim 5, wherein a paging slot cycle comprises sixty-four paging-channel timeslots, and wherein the maximum number of paging-channel timeslots between transmissions of a given type of overhead message is by default set equal to sixteen timeslots.

7. The method of claim 6, wherein adjusting the maximum number of paging-channel timeslots between transmissions of a given type of overhead message comprises setting the maximum number of paging-channel timeslots between transmissions of a given type of overhead message equal to a number of timeslots that is not a divisor of sixty-four.

8. The method of claim 6, wherein adjusting the maximum number of paging-channel timeslots between transmissions of a given type of overhead message comprises setting the maximum number of paging-channel timeslots between transmissions of a given type of overhead message equal to seventeen timeslots or fifteen timeslots.

9. The method of claim 1, further comprising, in response to detecting the page-shedding event, the base station determining a type of the overhead message involved in the page-shedding event, wherein adjusting the maximum period between overhead-message transmissions comprises adjusting a maximum period between transmissions of the type of overhead messages involved in the page-shedding event.

10. The method of claim 9, wherein the type of the overhead message is one of an Access Parameters Message, a CDMA Channel List Message, a System Parameters Message, an Extended System Parameters Message, a Neighbor List Message, an Extended Neighbor List Message, a General Neighbor List Message, a Global Service Redirection Message, an Extended Global Service Redirection Message, a User Zone Identification Message, or a Private Neighbor List Message.

11. A system comprising:
a non-transitory computer readable memory; and
program instructions stored on the non-transitory computer readable memory and executable by at least one processor to:
initially transmit one or more overhead messages according to a first duration of a maximum period between overhead-message transmissions, wherein each of the one or more overhead messages must be sent at least once during the duration of every maximum period;
subsequently detect a page-shedding event at a base station;
in response the page-shedding event, adjust a duration of a the maximum period between overhead-message transmissions from a first duration to a second duration, wherein a slot cycle duration of the base station is not a multiple of the second duration;
cause the base station to transmit the one or more overhead messages according to the adjusted maximum period between overhead-message transmissions; and
after transmitting the at least one overhead message according to the adjusted maximum period between overhead-message transmissions, readjust a maximum period between overhead-message transmissions back to a default period.

12. The system of claim 11, wherein the page-shedding event comprises an overhead message being sent in a given paging-channel slot instead of a page that was previously scheduled for the given paging-channel slot.

13. The system of claim 11, wherein the maximum period between overhead-message transmissions is by default set equal to 1.28 seconds, wherein the slot cycle duration is set to 5.12 seconds, and wherein the program instructions stored on the non-transitory computer readable memory and executable by at least one processor to adjust the maximum period between overhead-message transmissions comprise:

program instructions stored on the non-transitory computer readable memory and executable by at least one processor to set the maximum period between overhead-message transmissions equal to a period of which 5.12 seconds is not a multiple.

14. The system of claim 11, wherein the maximum period between overhead-message transmissions comprises a maximum number of paging-channel timeslots between transmissions of a given type of overhead message.

15. The system of claim 14, wherein a paging slot cycle comprises sixty-four paging-channel timeslots, wherein the maximum number of paging-channel timeslots between transmissions of a given type of overhead message is by default set equal to sixteen timeslots, and wherein the program instructions stored on the non-transitory computer readable memory and executable by at least one processor to adjust the maximum period between overhead-message transmissions comprise: program instructions stored on the non-transitory computer readable memory and executable by at least one processor to set the maximum number of paging-channel timeslots between transmissions of a given type of overhead message equal to a number of timeslots that is not a divisor of sixty-four.

16. The system of claim 11, further comprising program instructions stored on the non-transitory computer readable memory and executable by at least one processor to, in response to the page-shedding event, determine a type of the overhead message involved in the page-shedding event and adjust the maximum period between overhead-message transmissions according to the type of overhead message.

* * * * *